United States Patent [19]

Rathbun

[11] 4,095,118
[45] June 13, 1978

[54] SOLAR-MHD ENERGY CONVERSION SYSTEM

[76] Inventor: Kenneth R. Rathbun, P.O. Box 12637, Austin, Tex. 78711

[21] Appl. No.: 745,198

[22] Filed: Nov. 26, 1976

[51] Int. Cl.$^2$ .................. H02P 9/04; H02K 45/00
[52] U.S. Cl. .................................. 290/2; 290/52; 60/641; 126/270; 290/1 R
[58] Field of Search ............ 290/1 R, 2, 4 R, 4 D, 290/52; 310/11; 60/641; 126/270; 136/206; 203/DIG. 20

[56] References Cited

U.S. PATENT DOCUMENTS

| | | | |
|---|---|---|---|
| 3,070,703 | 12/1962 | Podolny | 290/2 |
| 3,487,240 | 12/1969 | Louis | 310/11 |
| 3,924,604 | 12/1975 | Anderson | 60/641 |
| 3,934,573 | 1/1976 | Dandini | 60/641 |

*Primary Examiner*—Robert K. Schaefer
*Assistant Examiner*—William L. Feeney
*Attorney, Agent, or Firm*—Roylance, Abrams, Berdo & Farley

[57] ABSTRACT

A solar energy conversion system includes a centrally positioned tower supporting a solar receiver, and an array of pivotally mounted reflectors disposed circumferentially therearound which reflect earth incident solar radiation onto the receiver which thermally excites and photo-ionizes a working fluid to form a plasma. The plasma is accelerated and further heated through a ceramic turbo-compressor into a magnetohydrodynamic (MHD) generator to produce direct current. The working fluid is then passed through a heat exchanger channel where the waste heat is removed by another working fluid which drives a vapor turbine connected to the ceramic turbo-compressor and an AC generator. Seed may then be removed and the working fluid is recycled in the closed cycle MHD system. The electrical power is distributed, part of it being used to electrolyze water into hydrogen and oxygen which are stored and allowed to exothermally recombine to drive the system during low solar radiation intervals. In a further embodiment the MHD working fluid receives its velocity from an external turbo-compressor driven by the second working fluid, and an alternative thermal and photo-ionization chamber is employed.

16 Claims, 10 Drawing Figures

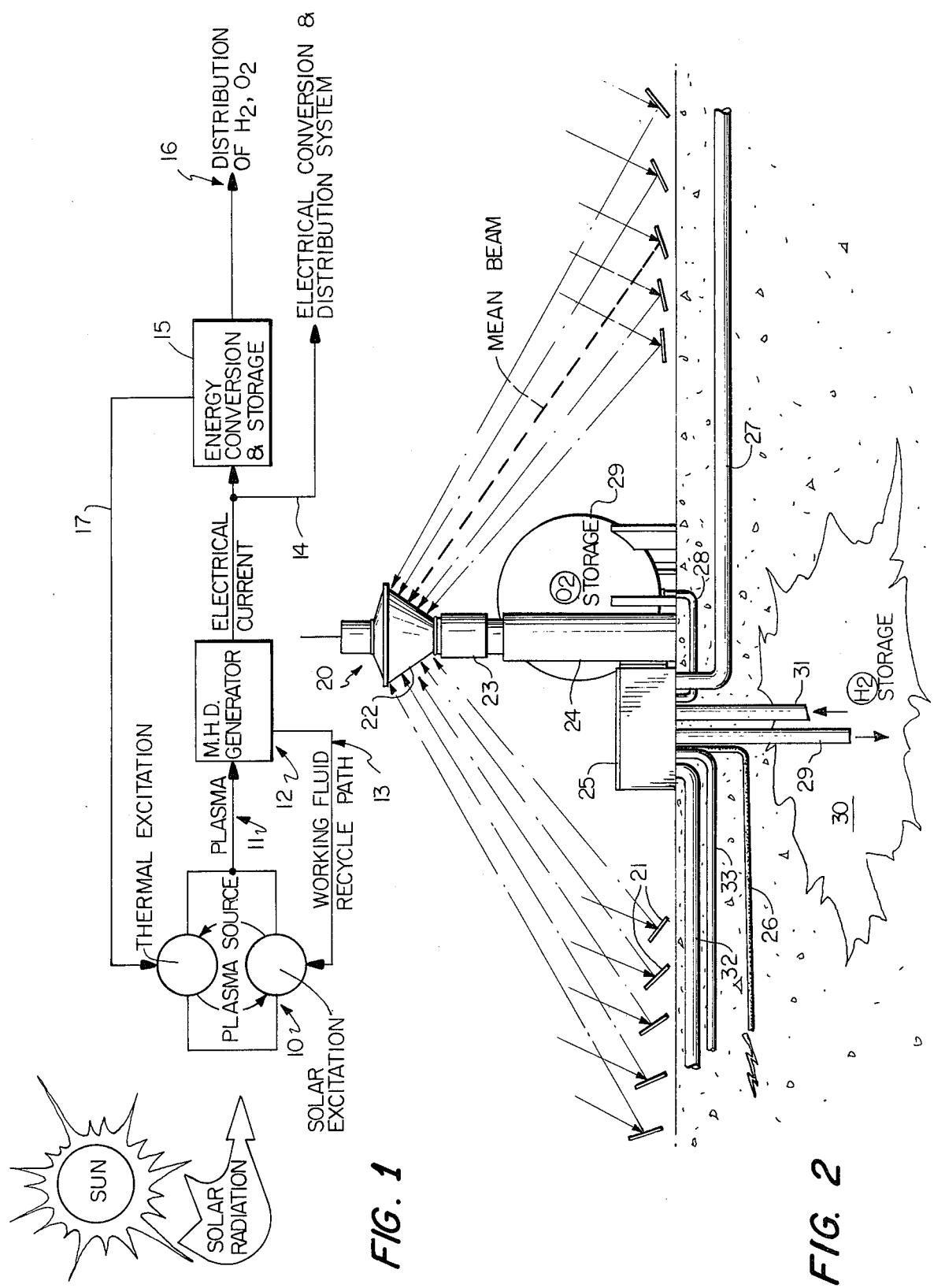

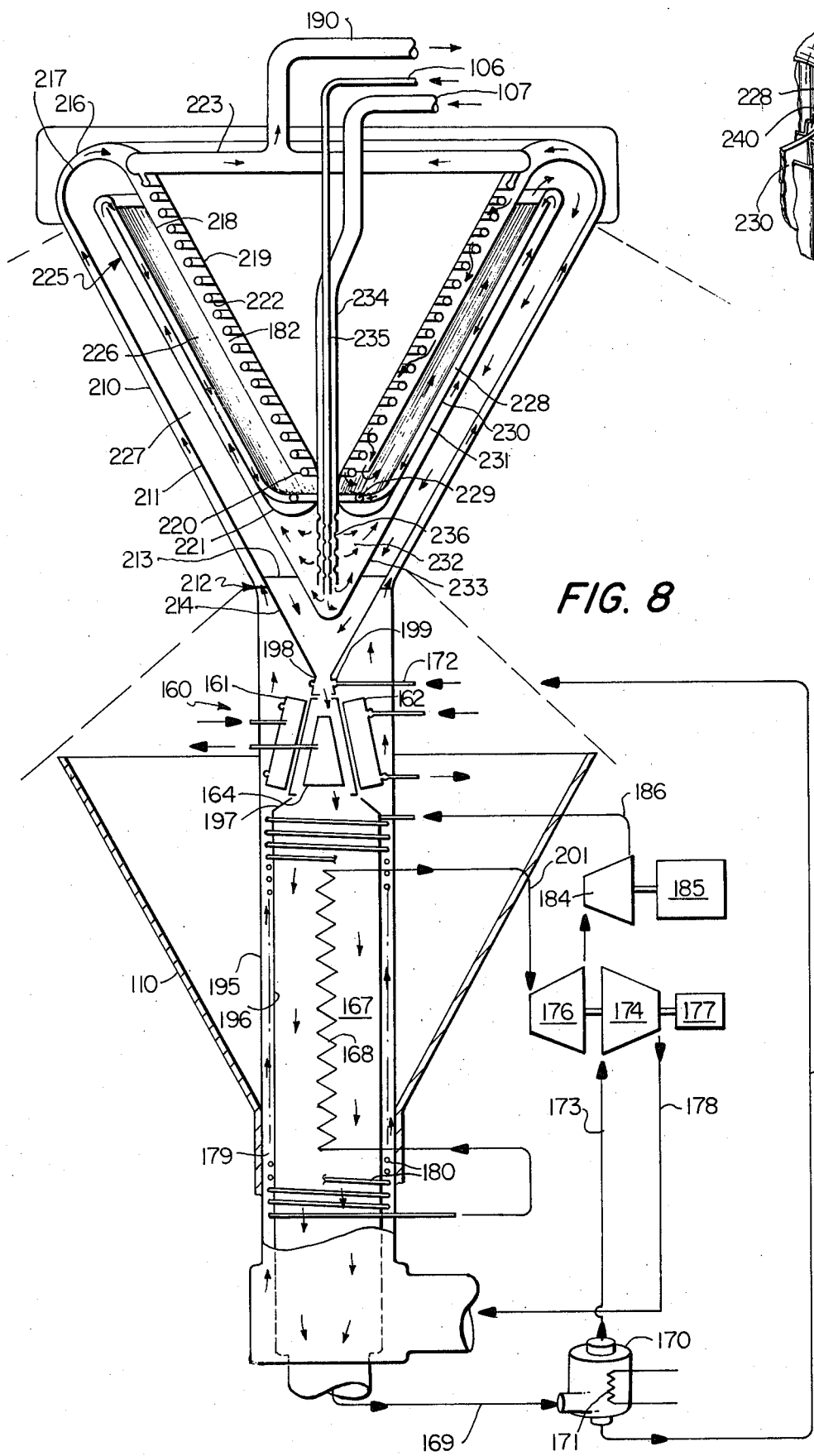
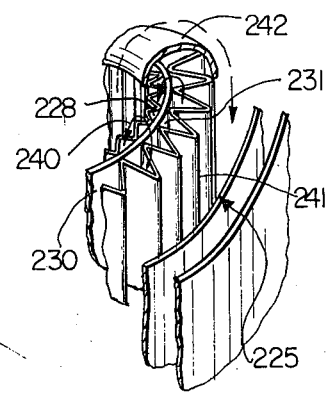
FIG. 8
FIG. 9

SOLAR-MHD ENERGY CONVERSION SYSTEM

This invention relates to electrical power generating apparatus and, more specifically, to apparatus using concentrated solar radiation and magnetohydrodynamic means for power generation.

BACKGROUND OF THE INVENTION

It is widely recognized that the conventionally used kinds of energy sources available to the U.S. as well as to the rest of the world are strictly limited and that many presently used techniques of energy conversion have highly undesirable side effects. No documentation need be cited to support the assertion that available fossil fuel materials are finite in quantity, even though estimates of remaining quantities differ. Oil and gas may be shortest in supply and even domestically available uranium ore resources are limited. While coal quantities are greater in terms of years of supply remaining, these are also clearly finite and combustion of coal of low grade (high sulfur) is a serious pollutant requiring extensive and expensive effluent cleaning operations. Thus, considerable attention has been given to improving known sources of energy and to developing new sources, particularly of electrical energy. Various alternatives have been considered.

Among these alternatives are solar energy, which has generally been regarded as either not usable for electric power generation or usable only in the event of the development of new conversion techniques. In an effort to develop new techniques, some research efforts are in progress and background information on certain aspects of this research are described at length in a document, "Energy Conversion Alternatives Study," NASA-CR 134948 (1976), prepared for the National Aeronautics and Space Administration and ERDA under a government contract.

One solar conversion technique which is being investigated uses an apparatus which includes an array of solar reflectors which concentrate solar radiation on a tower. The concentrated solar energy is used to heat water in the tower and the heated water vapor, in the form of steam, drives turbines, the turbines being used to mechanically drive rotary generators for producing electricity. While this appears to be an interesting and promising approach, and has the considerable advantage of avoiding burning fossil fuels, it is not a direct conversion system and still relies, as have earlier solar generating systems, on elevating the temperature of water or some other working fluid which is then used to mechanically, or thermodynamically, drive rotary generators. The capital investment in such a system is therefore necessarily quite large because it is ultimately restricted by steam turbo-generator efficiencies limited to about 40%. The systems as proposed would appear to be usable only as a "peak load" generator during daylight hours.

Indeed, solar energy generation systems have generally been viewed only as "peak load" generating systems, and it has been thought that solar energy would not present a viable "base load" generating approach, at least until further technological development has been accomplished, for two primary reasons, namely, that any specific location on the earth's surface, solar radiation is available for only about one-half of each day, more or less; and that batteries or some other means for storing electrical energy produced during those daylight hours for use during hours of darkness are expensive, relatively inefficient, and are limited in their power handling capabilities. It is in the area of storage technology that further development has been deemed essential.

Another alternative which has been and is being extensively investigated is the use of magnetohydrodynamic (MHD) generators. The patent and other literature on MHD systems is voluminous and the variety of system approaches is too great to permit even a cursory discussion of them in the present context. It is well known that such systems involve the production of a plasma which is caused to pass between electrodes and through a magnetic field. The plasma is a high temperature gas, fully or partially ionized, so that it contains ions, electrons and, if not fully ionized, neutral particles. The dynamic behavior of the charged particles responds to the presence of electric and magnetic fields. Thus, when a moving "stream" of plasma passes through a magnetic field normal (orthogonal) to the flow direction of the stream, oppositely charged particles are subject to opposing forces in the third orthogonal direction. Appropriately placed electrodes and circuit means can then be used to collect the charged particles as electrical current.

In known MHD power generating systems, the plasma itself is most commonly formed from combustion products of a fossil fuel mixed with compressed air. The largely gaseous product of the combustion is partially thermally ionized as a result of the combustion and the ionization is enhanced in recent technology by the addition of a "seeding" element such as an alkali metal such as cesium. A discussion of some of the theoretical aspects of MHD generators can be found in several articles in the IEEE Proceedings of September, 1968, (Vol. 56, No. 9), which was a special issue devoted to MHD.

Systems of this type have the significant advantage of providing efficient use of fossil fuels in direct power generation, but have the disadvantage of still using fossil fuel as the primary energy source. In addition, there are problems associated with the existence of fly ash and other impurities in the gas which forms the plasma in that these impurities tend to corrode and accumulate on the interior components of the MHD system itself, requiring provision for cleaning with the attendant necessity for shutting down the system.

The foregoing MHD systems are sometimes referrred to as "open cycle" systems in that the gas forming the plasma is discharged from the system after passage through the MHD generator. As will be recognized, the effluent gas must be "cleaned" before discharge to remove pollutants, much as with any other fossil fuel burning system. Also, the high temperatures at which such systems operate create difficult materials problems which have yet to be solved.

Another form of MHD system is referred to as being "closed cycle" because the plasma is retained within the system and is recycled for reuse. While a closed cycle system would have obvious advantages, including the absence of polluting effluents and efficiency at the stack, no practical power generating system based on this principle is known in the prior art.

SUMMARY OF THE INVENTION

An object of the present invention is to provide a system in which solar energy is utilized in a novel fashion to produce and drive a plasma through an MHD generator in a closed cycle system to generate electrical power.

A further object is to provide a system in which a working fluid is excited to ionization by a combination of thermal and photon energy to form a plasma which is then employed to generate electricity and wherein the moving working fluid is used as a selective absorption surface to maximize absorption of energy at solar radiation wavelengths and minimize re-emission losses.

Yet another object is to provide a system for generation of electrical energy which uses solar energy as its primary energy source during intervals of availability of such radiation and which includes a means for producing and storing products of a reaction powered by the system, which products can then be used during intervals of low or no solar radiation to drive the same system to continue to produce electrical energy, thus providing a base load power plant rather than a plant capable only of supplying peak load demand.

Briefly described, the invention includes an energy conversion system comprising an ionizable working fluid, a magnetohydrodynamic generator having an input and an output for the working fluid, means for providing an endless closed path for the working fluid between the output and the input of the generator and for producing flow of the fluid in the path, means in the path for exciting the working fluid to an elevated energy level at which the fluid is at least partially ionized into a plasma, means for concentrating solar radiation on the means for exciting so that the fluid is excited by both thermal and photon energy absorption, the circuit means connected to the generator for removing and using electrical energy therefrom.

It is also contemplated that the system in accordance with the invention can include means for accepting water from a source thereof and the electrical energy produced by the magnetohydrodynamic generator for electrolytically separating water from the source into hydrogen and oxygen, and means for separately storing the hydrogen and oxygen. The system can also include a combustion chamber in intimate counter flow heat exchange relationship with the working fluid, the combustion chamber being connected to the hydrogen and oxygen storage means to receive gases therefrom for exothermic recombination in the combustion chamber, whereby the working fluid can be thermally assisted toward ionization during intervals of low solar radiation.

In addition, the invention includes a method of energy conversion comprising the steps of providing an ionizable working fluid, passing the fluid through a chamber having a portion thereof exposed to solar radiation, ionizing the working fluid to form a plasma, delivering the plasma to a magnetohydrodynamic generator in the presence of a magnetic field to produce electrical energy, continuously recirculating the working fluid with a turbo-compressor from the outlet of the generator to the chamber for re-ionization, and wherein the step of ionizing includes, during intervals of maximum solar radiation, the steps of passing the working fluid through a closed chamber having a portion transparent to solar radiation so that the fluid is ionized by thermal and photon energy, and simultaneously concentrating solar energy on the transparent portion of the chamber.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a block diagram illustrating a system according to the present invention in simplified form;

FIG. 2 is a schematic diagram of the overall arrangement of a system according to the present invention;

FIG. 8 is a schematic diagram, in elevation and partial section, of an embodiment of power generation apparatus in accordance with the system of FIG. 7;

FIG. 9 is a detail view in perspective and partial section, of a portion of the apparatus of FIG. 8.

DETAILED DESCRIPTION

Figure 3:
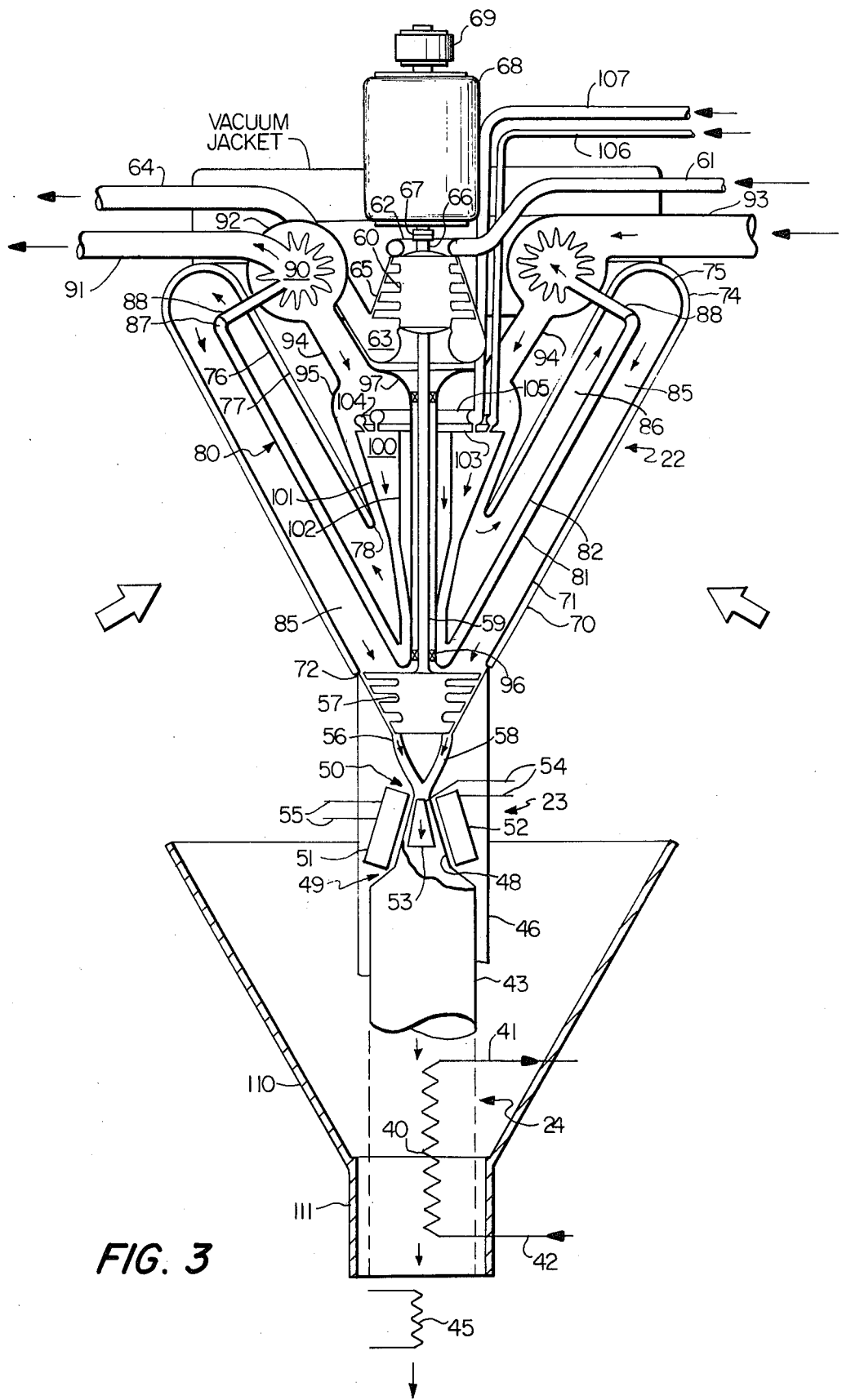
FIG. 3 is a more detailed diagram schematically showing a preferred embodiment of a power generator apparatus in accordance with the invention.

FIG. 1 shows an overall block diagram of a system incorporating the features of the present invention, which figures can be used for a general description thereof.

Earth incident solar radiation over a relatively large area of the earth's surface is concentrated, by devices forming a part of the prior art and to be described generally hereinafter, onto an apparatus which includes a portion of a closed path containing a working fluid, the concentrated solar energy being effective to excite the working fluid to an ionized state by a combination of thermal excitation and photon excitation, the thermal excitation being used to elevate the statistical energy level of the atomic and molecular working fluid to a level at which it is photon responsive, whereupon the working fluid can be photo-ionized, at least partially, but preferably to a substantial percentage, to form a plasma, this excitation being accomplished in the blocks indicated generally at 10. The thermal excitation due to solar radiation can also be supplemented by an exothermic reaction which will be further described. The fully or partially ionized plasma is accelerated as indicated at 11 into an MHD generator 12 which, in itself, is conventional in nature and which includes means for providing a magnetic field within a plasma path therethrough, and means for extracting electrical current resulting from the interaction of the magnetic field with the charged particles (electrons and ions) in the plasma to cause the particles to move toward electrodes which extract electrical energy from the plasma. The working fluid emanating from the outlet end of the MHD generator is recycled to the excitation unit as indicated at 13 and the electrical current removed from the MHD generator is connected to an electrical distribution system as indicated at 14, this system being conventional in nature. It should be noted that the type of MHD generator contemplated for use herein is a type which produces direct current. Thus, it would be desirable for the distribution system to include inverter means of a conventional nature to change the direct current into alternating current for more efficient distribution to users of the power.

At least a portion of the electrical current can also be connected to energy conversion and storage means 15. One particularly advantageous form of conversion and storage is electrolysis of water to form hydrogen and oxygen gases, which gases can conveniently be stored in various known ways. As byproducts of the system, the gases can be separately marketed for many purposes, as indicated at 16, but the gases can also be employed to render the apparatus of FIG. 1 usable for further power generation during intervals when solar radiation is not available, e.g., during nighttime and during intervals of heavy cloud cover. Under these circumstances, the hydrogen and oxygen can be conveyed to the thermal excitation means 10 along a path 17 wherein, in a suitable combustion chamber, the hydrogen and oxygen can be permitted to exothermically recombine. The combustion chamber is in intimate heat exchange relationship with the working fluid and can be operated at temperatures sufficient to cause thermal excitation of the working fluid to an ionization level even in the absence of solar photo-ionization, whereupon the identical system can be employed to produce plasma for delivery to the MHD generator and the production of electrical current. It will be apparent that during those intervals when electrical current is being produced solely through the recombination of hydrogen and oxygen, an efficiency drop would be experienced, with the power output of the system being used largely for production of electricity to the distribution system and none if it would be used in the energy conversion portion thereof.

The overall system can be designed using parameters which will permit the distribution of sufficient electricity to satisfy the needs of a community being served thereby and still permit the generation of sufficient hydrogen and oxygen such that these gases can be employed to maintain generation during low or nonexistent solar radiation hours, thereby rendering the system usable as a base load system for supplying electricity around the clock and throughout the year. It will also be apparent that if the system need only be used as a peak load system, the generation of hydrogen and oxygen can constitute a highly valuable byproduct of the system, these gases being commercially valuable and easily stored and transported by techniques well known in the art.

A schematic representation of the physical arrangement of components of the system is shown in FIG. 2. A central tower indicated generally at 20 includes most of the components illustrated in FIG. 1 and is centrally located in a substantially uniform array of circumferentially arranged reflecting devices which, for purposes of discussion herein, will be described as heliostats 21. The heliostats themselves have been the subject of considerable work and prior discussion, and need not be described in any detail. Two examples of arrangements of this general type, including descriptions of heliostat devices, appear in U.S. Pat. Nos. 3,892,433, Blake, and 3,924,604, Anderson, the Anderson patent also showing the general arrangement of a heliostat field with a centrally disposed tower. The purpose of the heliostats is to gather as much as possible of the solar radiation incident upon a relatively large area of the earth's surface, each heliostat being placed at a suitable angle to reflect the radiation incident thereon to the upper portion of tower 20. With average solar radiation varying between 150 and 280 watts per square meter, and up to 1,000 watts per square meter during peak periods, it will be apparent that very large amounts of power can be gathered and focused on a relatively small region such as the tower top using reasonable concentration ratios of 2,300:1.

The tower itself, the details of which will be described hereinafter, include an excitation portion 22 which has an exterior surface in the general shape of an inverted cone so as to present a substantially perpendicular surface to each beam of reflected radiation. It will be recognized that the beams reflected from the nearest heliostats and the farthest heliostats will not be exactly perpendicular to the conical surface of the excitation portion, but the surface can be arranged so that the mean beam thereof is perpendicular and the nearest and farthest beams deviate therefrom only by relatively small angles $\theta 1$ and $\theta 2$, these angles being approximately equal to each other. Cone diameters can be made large enough to prevent any significant horizontal reflection.

Immediately below the excitation portion 22 is the MHD generator portion 23 onto which ionized plasma from the excitation source is delivered for generation of power. Plasma emanating from the generator is delivered to the lower portion of the tower which includes the structural support, not illustrated, and a relatively large heat exchanger. As will be recognized, even though a substantial amount of energy is removed from the plasma in its course through the MHD generator, a substantial amount of heat will still exist therein, and this heat can be employed and recycled for the purpose of driving auxilliary equipment, particularly including a turbine compressor employed in the system to impart velocity and a turbo-generator bottoming cycle.

Electrical power extracted from the MHD generator is connected to a unit 25 which includes a switching apparatus and conversion means for converting the DC energy produced by the generator into alternating current for delivery to the AC distribution system schematically indicated at 26. Unit 25 can also include a conventional electrolyzer for utilizing a portion of the generated power to electrolytically separate water, supplied through a conduit 27, into its hydrogen and oxygen components in a well-known manner. The oxygen thus produced can be conveyed through a conduit 28 to an oxygen storage sphere 29 wherein the oxygen can be stored in either gaseous or liquid form, as desired. The hydrogen can be conducted through a conduit 29 to a convenient storage area which is illustrated in FIG. 2 as being an underground depleted gas formation 30 and can be removed therefrom through a conduit 31. While other storage tecniques can be used, similar in nature to the oxygen storage sphere, if the system described in FIG. 2 can be conveniently located near a depleted gas formation, such formations are safely and economically usable for storage of large amounts of hydrogen, this technique having been successfully demonstrated in the past.

Hydrogen and oxygen can also be delivered in conduits 32 and 33 to a remote location for other uses.

FIG. 3 shows, in somewhat greater detail, but still partially schematically, the arrangement of components and the internal structure of a specific embodiment of a conversion system for the tower 20. At the lower portion thereof is the previously mentioned heat exchanger 24 which includes a conduit 40 to conduct vapor turbine working fluid through the heat exchanger, conduit 40 having an inlet end 41 and an outlet end 42. The heat exchanger 40 can be conventional in nature, the requirements being that it conveys the turbine working fluid through the exchanger in good counter flow heat exchange relationship with the working fluid from the MHD generator to extract heat therefrom with the two working fluids being maintained completely separated from each other.

Conduit 40 is contained within a tubular structure 43 and an outer jacket 46 which is sufficiently structurally strong to support the equipment disposed above it and which rests on suitable supporting means on the ground, not shown. Conduit 43 acts an an exhaust conduit for the relatively high temperature working fluid emerging from the MHD generator and diffuser.

At the lower end of conduit 43, a seed recovery condenser 45 can be provided, this to be described in more detail hereinafter.

It is desirable for conduit 43 to be completely surrounded by jacket or sleeve 46, partially shown, which can be a double-walled metal jacket with an evacuated space therebetween to provide temperature isolation of the conduit 43 and the other components situated therebetween.

At the upper end of conduit 43 is MHD generator 23 which includes a generally conically shaped conduit 48 through which plasma is caused to pass, the conduit having a diffuser at the outlet end indicated at 49 and a nozzle at the inlet end indicated at 50. The MHD generator itself is conventional in nature and includes means indicated by blocks 51 and 52 for producing a magnetic field, such as with a superconducting magnet, within the MHD generator conduit and means 53 for collecting electrical power, in the form of charged particles, from the interior of the MHD generator conduit. Power is removed therefrom on a conductor schematically indicated at 54 from at least two such collector arrays 53 and the magnetic field producing means 51 and 52 are energized and maintained by current and refrigerants supplied on conductors 55 and suitable refrigerant conduits, not shown.

Immediately above the input end 50 of the generator a conduit portion 56 opens outwardly to receive the blade structure 57 of a compressor, the blade structure having a tapered nose portion 58. Blade structure 57 is rotatable within the conduit and is carried by a shaft 59 which extends vertically upwardly and is connected at its upper end of the rotatable drive portion of a vapor turbine 60. A conduit 61 is connected to an annular input manifold 62 to convey high temperature turbine working fluid from the high temperature outlet end 42 of heat exchanger 40 to drive the turbine. At the lower end of the turbine is an outlet manifold 63 which is annular in shape and which is connected to an outlet conduit 64 to convey the lower temperature turbine working fluid away from the turbine and back to inlet end 41 of heat exchanger 40. As indicated in the drawings, annular manifolds 62 and 63 are connected to each other by a turbine housing 65 which surrounds the turbine 60 in a conventional fashion. It is contemplated in this embodiment that the compressor blade structure be a ceramic structure and that it be located as shown immediately above the MHD generator.

The upper end of turbine 60 is connected to a shaft 66 which, through a clutch 67, is connected to the drive shaft of a conventional AC generator 68 from which AC power can be removed when the turbine is driven by the working fluid. A starter motor 69 is mounted atop generator 68 and has a common shaft therewith for purposes of initiating the action of the turbine. By conventional circuit control means, not shown, the generator can either be left to simply rotate with the turbine or can be used to produce output power if the working fluid under specific operating conditions existing at any particular time are suitable therefor.

Figure 4:
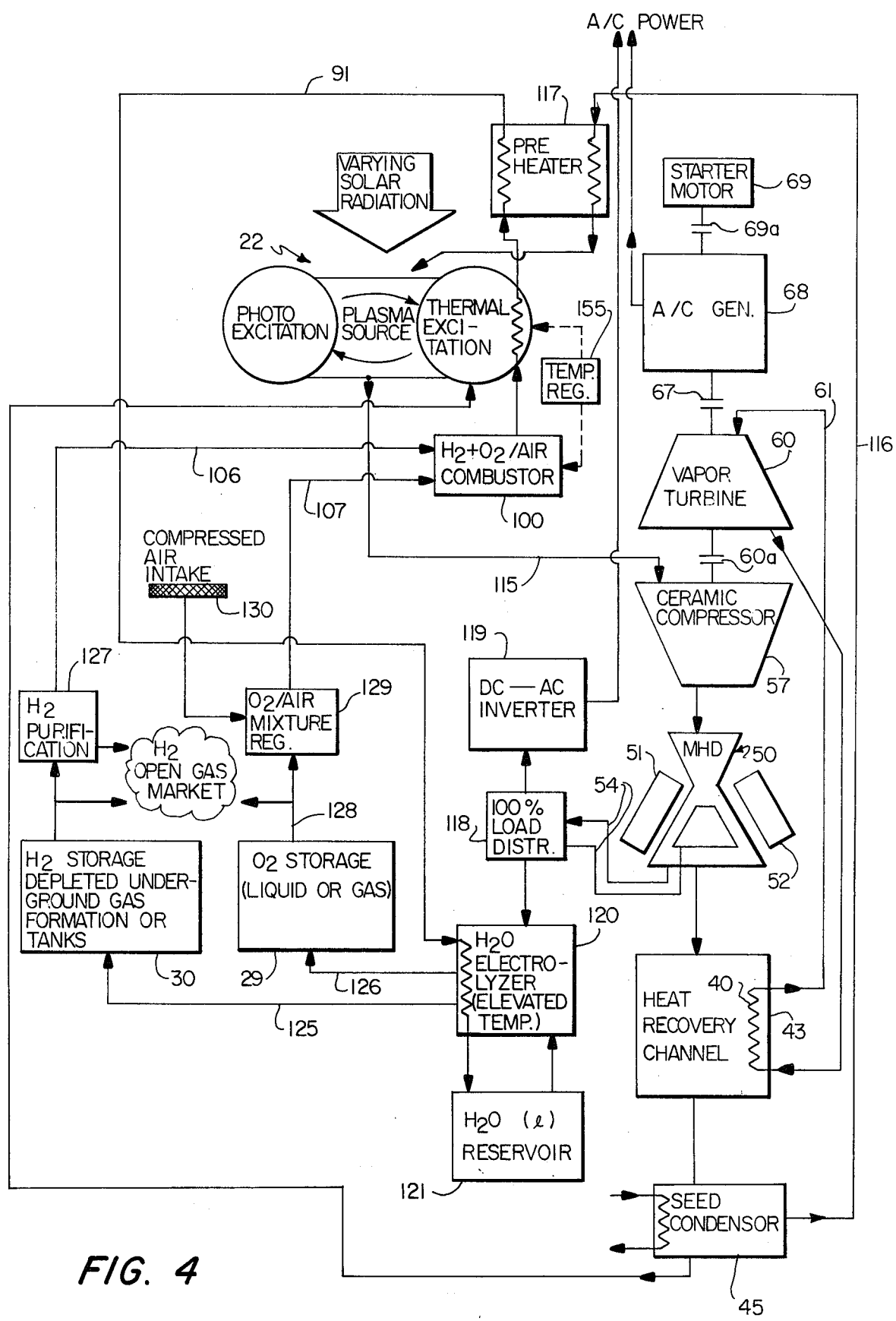
FIG. 4 is a more detailed block diagram of the energy conversion, power generation and energy storage portions of a system according to the invention showing the energy flow therein and the major components of the system.

Extending upwardly and outwardly from the upper end of jacket 46 is a frustoconical wall structure including concentric closely spaced frustoconical walls 70 and 71, walls 70 and 71 being sealed to each other and to the upper end of jacket 48 at the circular interconnection line 72. At the upper and outer extremity of these conical wall portions are semi-circular, or semi-annular, interconnecting wall portions for each of the walls, the portion 74 forming a continuation of wall 70 and the portion 75 forming a continuation of walls 71. As seen in FIG. 4, these interconnecting portions are generally U-shaped, the upper leg of the U being connected to the upper ends of frustoconical wall portions 76 and 77 which are sealed to each other at the inner lower extremities thereof around a circular line indicated at 78. The wall structure thus described and shown forms a conical annular chamber for the flow of working fluid for the MHD generator, this chamber being separated into two frustoconical annular flow paths by a separating portion constituting a heating chamber indicated generally at 80 and including an outer frustoconical wall 81 and an inner frustoconical wall 82, these two walls defining a third chamber within the largest chamber for the flow of material undergoing an exothermic reaction, as will be described.

The outer flow path previously mentioned, which will now be idendified as flow path 85, contains working fluid flowing generally downwardly toward compressor 57 between walls 71 and 81, and the inner chamber which will be identified as flow chamber 86 contains working fluid flowing generally upwardly between walls 76 and 82. As will be seen, the flow changes direction at the interconnecting portions defined by wall portions 74 and 75 and the upper extremity of the interior flow path between walls 81 and 82.

At the upper end of the interior flow path between walls 81 and 82 is an annular portion 87 which is in the nature of a downwardly opening semi-circular annular pipe to close the upper end of the conduit. A plurality of generally radially inwardly extending conduits 88 are connected at circularly spaced points around portion 87, these conduits extending through walls 76 and 77, being sealed thereto, the other ends of the conduits terminating in an annular splined heat exchanger chamber 90 to which is connected an outlet conduit 91. Thus, material flowing upwardly between walls 81 and 82 flows upwardly and radially inwardly through conduits 88 and into chamber 90, and then out through conduit 91.

Heat exchanger chamber 90 is contained within an annular jacket 92 which is connected to an inlet conduit 93 through which low temperature MHD working fluid passes from the lower end of heat exchanger 24 through an insulated conduit from the lower end of tubular conduit 43 at the bottom of the tower. The annular jacket 92 is connected by a plurality of downwardly extending conduits 94 to an enlarged jacket portion 95 which is annular, the outer generally cylindrical walls thereof being connected to the lower sealed end of walls 76 and 77 at line 78, as previously described. The inner generally cylindrical wall of the jacket portion surrounds shaft 59 and is connected to the lower extremity of conical wall 81. Bearing means 96 and 97 at the lower and upper ends of the cylindrical wall support shaft 59 for rotation within this space.

An annular tapered chamber 100 is contained within jacket portion 95 and is defined by walls 101 and 102 which are spaced from the walls of the jacket portion. At the upper end of chamber 100 is a generally flat annular wall 103 which is connected to tubular conduits 104 and 105 which are connected, respectively, to inlet conduits 106 and 107. Conduits 106 and 107 receive hydrogen and oxygen gas, respectively, these gases being coupled into the tubular annular conduits 104 and 105 for substantially uniform injection of these gases into chamber 100 wherein exothermic recombination of the gases is permitted. Check valves can be provided in the connections between conduits 104 and 105 and chamber 100 to prevent backflow of the gases beyond chamber 100 which can be referred to as a combustion chamber. As previously indicated, the hydrogen and oxygen can be supplied to these conduits from the storage chambers described with reference to FIGS. 2.

As will be recognized from the above description, there are plural paths for two separate working fluids and an additional path for the hydrogen and oxygen input and water vapor output from the system. These paths will now be traced individually.

Beginning at the upper right-hand portion of the diagram in FIG. 4, the low temperature MHD working fluid is delivered into conduit 93 at a temperature of between 30° and 100° C. into annular chamber 92 wherein the temperature of this working fluid is elevated by contact with the fins of chamber 90 which is a portion of the combustion chamber output. The partially heated working fluid is conducted downwardly through conduits 94 into jacket portion 95 wherein the temperature of the working fluid is further elevated by contact with walls 101 and 102 of combustion chamber 100. The working fluid then flows upwardly in chamber 86 between walls 82 and 76 wherein the temperature of the working fluid is thermally excited to a higher energy level by the solar energy received by that chamber. The direction of flow reverses at the upper end of that chamber and the working fluid then passes downwardly through the outer chamber defined by walls 81 and 71, the working fluid at this stage being both thermally and photon excited and ionized into plasma form. The plasma thus formed is then impelled downwardly by compressor 57 into the MHD generator wherein it is subjected to the action of the magnetic field and wherein electrical power is generated. The exhaust plasma then passes downwardly through conduit 43 and is conveyed upwardly again to inlet conduit 93 from which the cycle is repeated.

Meawhile, oxygen and hydrogen gas is delivered through conduits 106 and 107 into chambers 104 and 105 from which it is permitted to enter chamber 100 wherein the exothermic recombination occurs, supply heat to the working fluid. The high temperature vapor thus formed is conveyed downwardly to the lower end of that chamber and upwardly through the annular chamber defined by walls 81 and 82, imparting further energy to the working MHD fluid. The water vapor, in the form of steam at this stage, passes through conduits 88 to annular chamber 90 from which further heat is extracted from the water vapor, after which it is discharged through conduit 91. The water vapor at this stage is at a relatively low temperature and can be exhausted to the atmosphere as the only effluent from the system, or can be delivered to the electrolyzers.

The third path is that of the turbine working fluid, which fluid is extracted from heat exchanger 40 through conduit 42 and injected into the upper portion of the system through conduit 61 into turbine 60, driving the turbine and, therefore, the compressor. The working fluid from the turbine passes through annular chamber 63 and out through conduit 64, being returned in a closed cycle to conduit 41 at the upper end of heat exchanger conduit 41.

As previously indicated, it is possible to operate the system using only solar energy during intervals in which the incident solar radiation is sufficiently intense for this purpose. In this case, oxygen and hydrogen gas is not delivered to conduits 106 and 107 and the excitation occurs only through solar energy which elevates the temperature of the chambers between walls 71 and 76, thermally exciting the working fluid as it passes upwardly through the inner chamber to a level at which it is photo-ionizable as it passes downwardly through the outer chamber. The operation in this circumstance is substantially identical to that described above except that little or no heat is added by combustion chamber 100 and its associated conduits.

Alternatively, during intervals of darkness or low solar radiation the hydrogen and oxygen input can be used to add heat or can be used to accomplish the total ionization task. In this latter circumstance, it is desirable to minimize heat loss by conduction or radiation through the outer walls of the chamber. Since the outer walls of this chamber are transparent, it is desirable to provide a shield to eliminate this outward radiation. For this purpose, there is provided a conical shroud 110 which is constructed using a material having low thermal conductivity, or of well-insulated mild steel, with a reflective inner surface to reflect radiation back inwardly toward the working fluid chambers. Shroud 110 is supported on a cylindrical sleeve 111 which surrounds jacket 46 and is slidable upwardly and downwardly. In the position shown, in which the shroud is in a downward position, radiation can be received by the excitation chamber. During intervals of darkness, the shroud can be elevated so that it tightly fits around the excitation chamber, preventing radiation loss and permitting the system to operate by thermal excitation primarily, and black body radiation secondarily, through the supply and recombination of hydrogen and oxygen as previously described. The shroud can be moved upwardly and downwardly by any convenient electrical, mechanical or hydraulic means, not shown, such as cylinder and piston structures, rack and gear drive, or the like. Such mechanisms are well known and need not be described in detail.

For purposes of permitting a clearer understanding of the operation of the system, a more detailed block diagram which includes blocks representing the apparatus previously discussed with reference to FIG. 3, is given in FIG. 4. As shown therein, the tower itself includes, from the top, a starter motor 69, an AC generator 68 which is connected to the starter motor and which can include a selectively operable clutch 69a, a vapor-operated turbine coupled to the AC generator by a clutch 67, a compressor 57 coupled to the vapor turbine shaft, this also optionally having a clutch 60a, and an MHD generator indicated at 50. Ionized plasma is supplied to the ceramic compressor as indicated at 115, this being the flow from chamber 85, the compressor imparting velocity to the plasma, elevating its temperature further and driving it into the MHD generator. The working fluid emerging from the MHD generator is supplied to the heat recovery channel in conduit 43 having heat exchanger 40, the working fluid from the heat recovery channel being supplied to a seed recovery unit indicated at 45 which is supplied with a low temperature fluid for the purpose of condensing out seed, such as cesium, if desired. The relatively low temperature MHD working fluid is then supplied on a path indicated at 116 to the preheating apparatus 117 which is equivalent to the combustion chamber and heat exchanger 90 in FIG. 3. The elevated temperature working fluid is then supplied to the thermal excitation and photo excitation chambers, as previously described, forming the plasma which is supplied to the compressor.

The DC current generated by the MHD generator is supplied on conductors 54 to a load distribution unit 118 which can be controlled to distribute the generated electrical power as desired. It is contemplated that a major portion of this power would be supplied to a DC to AC inverter unit 119 wherein alternating current is produced for use in the system as well as for distribution to a community being served. It will be recognized that AC generator 68 also produces alternating current power which can be similarly used for other aspects of the system or supplied to the user community. It will be further recognized that the amount of power withdrawn from generator 68 can be controlled in a well-known manner to vary the load on the turbine-compressor structure, it being recognized that the primary purpose of the turbine is to accelerate the plasma, the alternating current produced by the generator being a byproduct of this process.

DC energy can also be supplied to an electrolyzer 120 which receives water from a water source or reservoir indicated at 121 and which can also include a heat exchanger connected to use the water vapor output from conduit 91 to raise the temperature of the water from source 121 and the efficiency of electrolyzer 120. The water from source 121 is electrolyzed into hydrogen and oxygen gas conveyed on conduits 125 and 126, respectively, to previously mentioned storage locations 30 and 29. These gases are then available for separate sale and other use, and are also available for use within the system, as previously described. As shown in FIG. 4, the hydrogen can be further purified, as may be necessary where depleted gas formations are used for storage, by a conventional hydrogen purification unit indicated at 127 and delivered on conduit 106 to combustor 100. The oxygen can be removed from storage in a conduit 128 and can be mixed with air and pressure regulated in a mixing and regulating unit 129, the air being supplied in a compressed form from a compressed air intake 130. The oxygen with or without air can then be delivered on conduit 107 to combustor 100. This exothermic reaction is then used to thermally excite the MHD working fluid, the water vapor or steam at this stage being used in preheater 117 as previously indicated.

Figure 5:
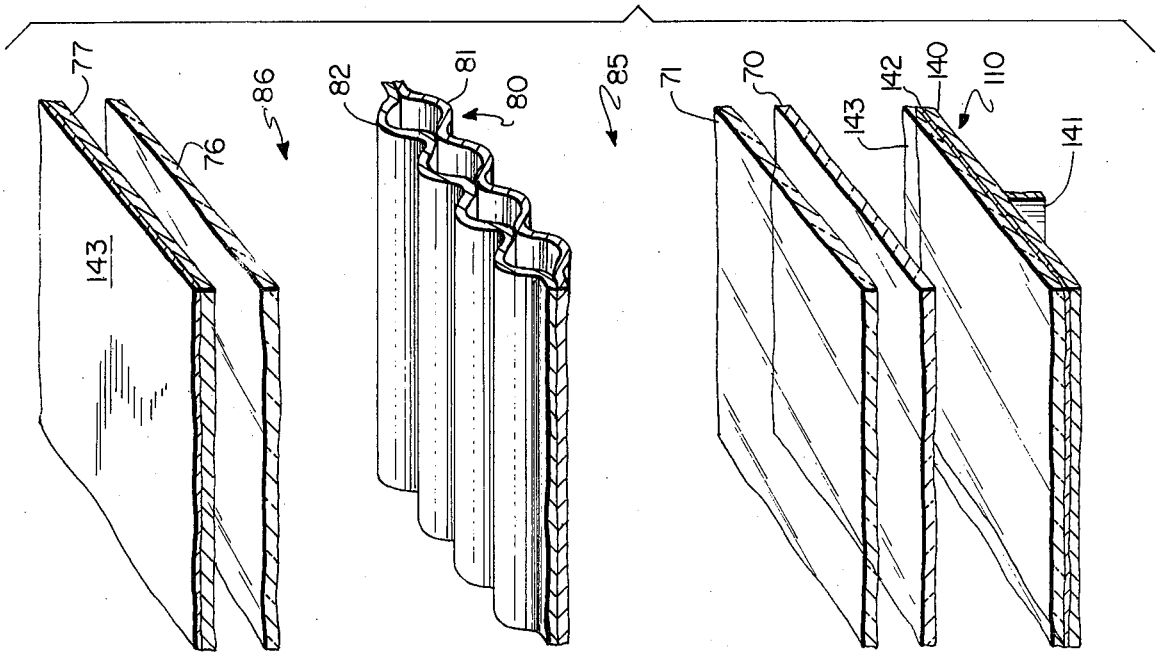
FIG. 5 is a partial perspective view, in section, of one embodiment of an excitation chamber structure usable in the apparatus of FIG. 3.
Figure 6:
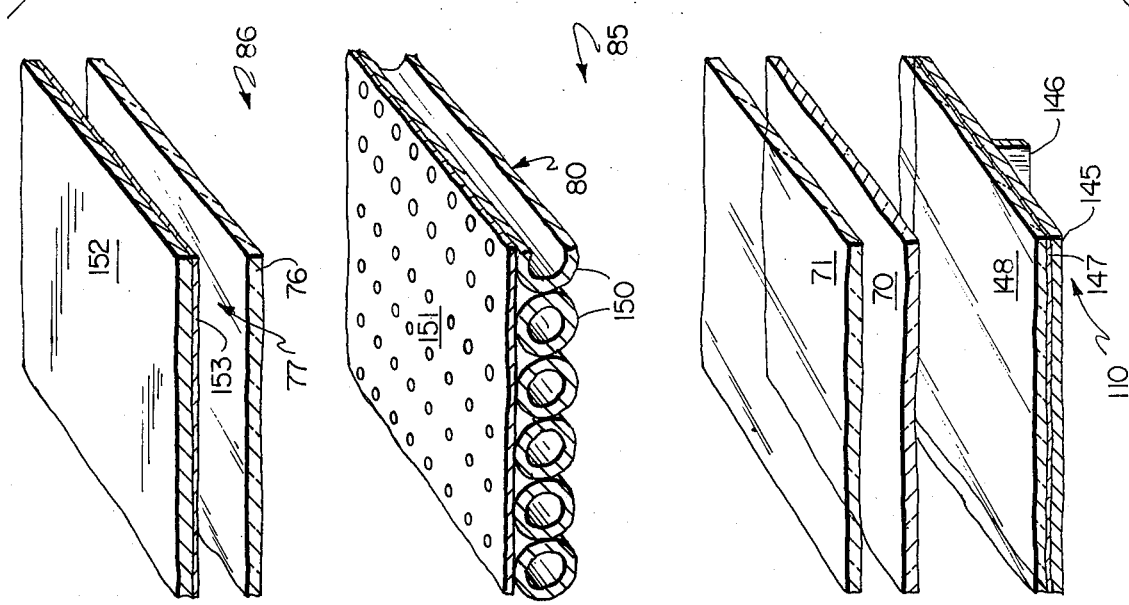
FIG. 6 is a partial perspective view, in section, of a second embodiment of an excitation chamber structure usable in the apparatus of FIG. 3.

FIGS. 5 and 6 illustrate in more detail the specific structure of the walls forming chambers 85 and 86 wherein the MHD working fluid is excited to ionization. In each of these figures a relatively narrow section through the wall structure is illustrated, the walls therein being shown as planar members for purposes of simplicity, although it will be understood that these walls actually curve to form the frustoconical form illustrated in FIG. 3. It should also be recognized that the portions of the wall are shown as a section with the right-hand edge of each portion shown being that which is toward the top of the wall structure.

As shown in FIG. 5, the outermost portion of the structure is the shroud 110 which includes a mild steel substrate 140 with a plurality of stiffening ribs 141, each rib lying in a vertical plane and extending upwardly and outwardly along the outer surface of the shroud to enhance the structural rigidity of the structure. A reflective coating 142 of silver is electrodeposited on the inner surface of wall 140 to reflect radiant energy backwards into the chambers. A glass lining 143 can be provided on the inner surface to protect the reflective surface from weathering. An alternative, less expensive technique, is to apply silver nitrate to the outer surface of glass lining 143 instead of electrodepositing silver on the inner surface of wall 140.

Walls 70 and 71, forming the outer transparent walls of chamber 85, are formed from quartz and are sealed, as previously described, to establish a vacuum therebetween in the order of $10^{-4}$ to $10^{-7}$ Torr. Each of walls 70 and 71 can be on the order of 1 to 10 millimeters thick.

Within cavity 85, walls 81 and 82, forming the inner chamber 80; can be formed using corrugated metal sheets of a generally sinuous cross-section with the adjacent portions thereof being spot-welded together. These sheets can be several millimeters thick and can be made from metals or alloys of metals selected from the group including chromium, molybdenum, niobium, titanium, tungsten, zirconium, thorium or tantalum, for example. Such metals are suitable for use at the temperature ranges of 1,500–1,800° C. which are encountered in this region. As previously indicated, the tubular chambers formed by welding these walls together contain the flow of relatively high temperature water vapor, and the plasma working fluid flows on either sides of these walls.

Inner walls 76 and 77 are also quartz sealed together to form an evacuated chamber therebetween with the vacuum being in the same order of magnitude as between walls 70 and 71. Each of walls 76 and 77 can be in the order or 1 to 10 millimeters thick with wall 77 additionally having a reflective coating 143 of silver nitrate on the back surface to contain maximum heat within the excitation cavity.

FIG. 6 shows a slightly more expensive and somewhat higher efficiency alternative arrangement for the structure in which some components are the same and others are modified. As shown in FIG. 6, the shroud can be constructed using a mild steel outer structural substrate 145 also having ribs 146 for added rigidity. A layer 147 of electrodeposited silver is provided on the inner surface of substrate 145 and a quartz liner 148 is provided on the inner surface of the shroud. Walls 70 and 71 are formed using quartz, as in the case of the embodiment of FIG. 5.

Wall 80 in the embodiment of FIG. 6 is constructed using a plurality of metal tubes 150 in contiguous parallel relationship, the tubes being spot-welded to a sheet metal cone 151. Tubes 150 and cone 151 can be formed using the same metals as suggested for corrugated sheets 81 and 82 in FIG. 5.

Wall 76 is again formed using quartz as in the prior embodiment and wall 77 employs a mild steel conical substrate 152 with an electrodeposited silver coating 153 formed on the inwardly facing surface thereof.

It will be recognized that the invention described herein constitutes a major advancement in the state of the art in an overall system wherein the sun produces the plasma for a closed cycle MHD generator and by thermal and photoexcitation to ionization of a plasma for the generator, the device being capable of receiving hot gases produced by combusting hydrogen and oxygen as produced by electrolyzers driven by the MHD generator, thus sustaining plasma generation during periods of solar intensity variations. Intensity variations and night conditions thus overcome by the use of electrolyzers which operate at higher efficiencies due to the waste heat recovery system whereby the electrolyte is raised to higher temperatures. Hydrogen gas produced at the electrolyzers is stored in a suitable container, preferably in a depleted underground gas formation, since large hydrogen gas volumes are produced. The gases produced have the additional advantage of being marketable separately for use in conventional combustion power plants or in highly efficient fuel cells. The gas production and partial reconsumption by plasma generation additionally provides a means of allowing the entire solar-MHD system to operate under continuous 100% allows the system to be for optimum efficiency as well as allowing the solar plant to be utilized as a base load plant instead of a peak load load plant which heretofore has been considered as the only practical application for solar power plants due to the intermittent nature of solar radiation.

A serious problem of solar energy systems is that of reradiation of energy by absorber panels due to black body emission by the panels at high temperatures. Much research has been conducted to devise a selective surface which will absorb as much solar radiation as possible while reradiating as little energy as possible, usually infrared, back to the atmosphere. The present invention thus teaches a technique for selectively "coating" a surface with a layer of gas, the MHD working fluid, such that the selective surface actually constitutes the working fluid which partially absorbs entering solar radiation by photo-ionization of the working fluid which has first been thermally pre-excited by the heating surface to a point where the ionization potential of the working fluid has effectively been lowered, thus allowing entering solar photons, most of which are in the visible to near infrared regions, to be absorbed by the fluid which is actually a gas at this stage. A high percentage of infrared reradiation of the heating surface will either be re-absorbed by an adjacent fin of the absorber panel due to the design geometry, or while experiencing a longer path length through the plasma will likewise be absorbed by the working fluid. Any reradiation loss of energy by the working fluid itself is limited to the point of solar photoionization. Since this may be thought of as optical pumping and as long as the pumping source, the sun, is exciting the working fluid, this reradiated emission is limited to spontaneous emission of the plasma as determined by the line intensity distribution of the emission spectra and influenced by the condition of the plasma. In addition, due to the random nature of spontaneous emission, the probability of the emitted photon traveling in the direction of the solar source, and thus escaping the system, is substantially reduced. Furthermore, those photons which do travel in that direction can be made to have a high probability of being reabsorbed by the working fluid itself by controlling the plasma conditions. Finally, most photons with wavelengths of longer than 2.5 microns will be absorbed by the quartz vacuum panel, converted to thermal energy in the quartz, and then conducted back to the plasma confined therein.

An additional improvement in the state of the art is that by employing the solar-produced plasma device, coal is not required as a heat source, thus eliminating the severe problems accompanying that use including coal-ash corrosion of internal components, the need for costly electrostatic precipitators for seed recovery, ash buildup inside MHD channels, atmospheric stack pollutants such as nitrogen, carbon and sulfur oxides, stack reject heat is eliminated, and surface ecology is thus preserved as well as avoiding health hazards potential to coal miners.

Thus, referring again to the structure of FIGS. 3, 5 and 6, when the solar energy impinges upon the face of the outer quartz vacuum jacket 70 and 71, about 81% to 90% of the radiation is transmitted through both of the outer quartz panels and the enclosed vacuum cavity onto the plasma which is a gas, usually but not necessarily an inert gas which can also include a seeding agent such as an alkalai metal vapor or salt at an atomic concentration of 2% or less. As previously indicated, argon gas seeded with cesium vapor can be used. Common gases are only weakly ionized below 6,000°-7,000° Kelvin and operating temperatures would, in the case of a pure gas, need to be higher than the ionization threshold temperatures. It has been found, however, that by adding a small amount of an easily ionizable material, usually 0.01-1% by volume, the threshold ionization temperature is reduced by as much as 60-70%. Thus, in the case of argon seeded with cesium, the working temperature can be reduced to 1,500°-2,000° Kelvin (approximately 1,227°-1,727° C.)

Since the softening temperature for quartz is approximately 1,670° C., it will be recognized that at the point where the solar radiation passes through the quartz vacuum jacket, temperatures are limited to values not exceeding the softening point (preferably below the 1070° C. strain point) and, by controlling gas flow, are advantageously maintained at about 1,500° C., (about 1000° C. with equalizing pressures of 287 psi of the quartz wall in the second embodiment) the plasma being under a slight pressure.

Part of the entering radiation is absorbed by the argon-cesium plasma through photo-ionization. The remainder is transmitted to the metal heater panel 80 between photo-excitation cavity 85 and thermal excitation cavity 86. The solar energy delivered to this metal heater panel is thermally conducted to an entering stream of argon-cesium working fluid which is confined and channeled by the panel and to another quartz vacuum jacket behind it. The second quartz vacuum jacket has the same temperature limitations as the first, but is different in that the outermost wall is coated with a reflective surface such that any infrared radiation emitted by the metal heater panel separating the two cavities will be reflected back onto the working fluid with net efficiencies ranging from 85-91%. Both vacuum cavities are held to about $10^{-4}$ to $10^{-7}$ Torr pressure to minimize convection losses.

The entering working fluid in cavity 86 is thus heated from an entering temperature (depending upon the degree of hydrogen and oxygen combustion employed) of from about 100° C. to about 1,200° C. by thermal conduction from the metal heater panel. The heating of the working fluid induces partial thermal ionization and partial photo-ionization, the latter being due to black body infrared radiation from the metal heater panel itself.

Having been thermally heated to these temperatures, the working fluid consists of a mixture of electrons, positive ions and neutral atoms and can be, for convenience, called a plasma. More importantly, the electrons in many of these neutral species are no longer in their ground orbitals and by properly controlling the conditions may be made to reside, as a population average in some desired orbital. In the case of argon, once the electron has reached the 4P orbital, this neutral atom is now capable of being excited by protons in the visible region, mostly in the range of 0.44 microns to approximate 0.8 microns wavelength. The emission spectrum for neutral argon indicates approximately 450 absorption lines in this region. For those electrons which have been thermally excited to the 3D orbital, there are approximately 170 emission lines indicated for neutral argon for infrared wavelengths ranging from 0.8 microns to 2.5 microns which is the approximate limit for incident solar radiation. It is, of course, apparent that a continuum is formed somewhere in the infrared region and this would cover black body radiation generated internally at wavelengths greater than 2.5 microns. Since the ionization potential for cesium is about approximately 3.9 electron volts (ev), this element would be photo-ionized with very little thermal excitation. The net effect of the thermal excitation to the 4P, 3D, etc., orbitals is, of course, to modify the nature of the working fluid so that it becomes excitable by solar photons and may be photo-ionized by direct illumination from the light reflected by the heliostats as well as serving as a selective coating to the metal heater panel absorbing its reradiated black body radiation.

The plasma, after passing through the solar excitation cavity is, as was previously mentioned, at about 1,500° C. Since higher temperatures would be desirable and high velocities are necessary for MHD systems to be effective, the plasma is accelerated using compressor 57, which is preferably a ceramic compressor, driven by turbine 60, the temperature being raised by the compressor to about 1,700° C., and the plasma being thereby given its primary velocity. The plasma is then expanded through the MHD nozzle represented by the reduced portion shown in FIG. 3 and passed through a magnetic field supplied by a super-conducting magnet.

The turbine driving the ceramic compressor is driven by a working fluid which is heated in the heat recovery channel by waste heat from the exhaust gas of the MHD generator. The vapor turbine operates at a constant rpm and also drives an AC generator which acts as a bottoming cycle to increase overall efficiency. The starter motor 69 is connected to the AC generator/vapor turbine assembly to initiate operation.

As solar radiation is subject to cloud interruptions and night periods, temperature fluctuations at the metal heating panel may be expected. To compensate for this a temperature regulating device 155 (FIG. 4) connects this panel to a hydrogen and oxygen gas metering apparatus which regulates the hydrogen and oxygen combustor operation. As solar intensity drops, additional hydrogen and oxygen gas is drawn out of storage and combusted to provide high temperature steam which circulates through passages in the metal heating panel 80 thus sustaining the temperature for maximum operating efficiency. Photoionization will drop off proportionately and, except for black body internal radiation, will drop off completely at night. To take full advantage of the infrared radiation and to avoid losses, the reflective shroud 110 is slid into place, completely covering the quartz face of the exterior quartz vacuum jacket. This serves to reflect 88% to 91% of the black body infrared radiation back into the plasma.

The high temperature steam, upon leavng the metal heating panel 80, is passed through a working fluid preheater 90 which serves to transfer waste heat from the steam to the incoming low temperature working fluid. Additional preheating of the working fluid is accomplished by passing it around the combustor itself just prior to its entering the thermal excitation chambers.

Additional waste heat is removed from the steam by passing it through a heat exchanger immersed in electrolyte of the electrolyzers. This serves to elevate the temperature of the electrolytes which, as is well known, increases the efficiency of the electrolization process. Condensed water vapor leaving the combustor, the metal heating panel, the working fluid preheater and the electrolyzer can be stored in a separate storage tank to preserve its distilled nature prior to re-electrolizing in a subsequent operating cycle.

A further step which can be employed to additionally increase the thermal efficiency is the provision of a metal vacuum jacket 157 which encases the entire structure at the tower top except for the quartz vacuum jacket itself in a metal shield, this being easily accomplished because of the compact geometry of the apparatus.

FIGS. 7, 8, 9 and 10 show a further embodiment of an apparatus in accordance with the invention. This embodiment is based on similar principles as the apparatus previously discussed and operates, overall, in a similar fashion. However, there are areas of simplification and improvement, particularly in the excitation of the plasma and in the turbines.

Figure 7:
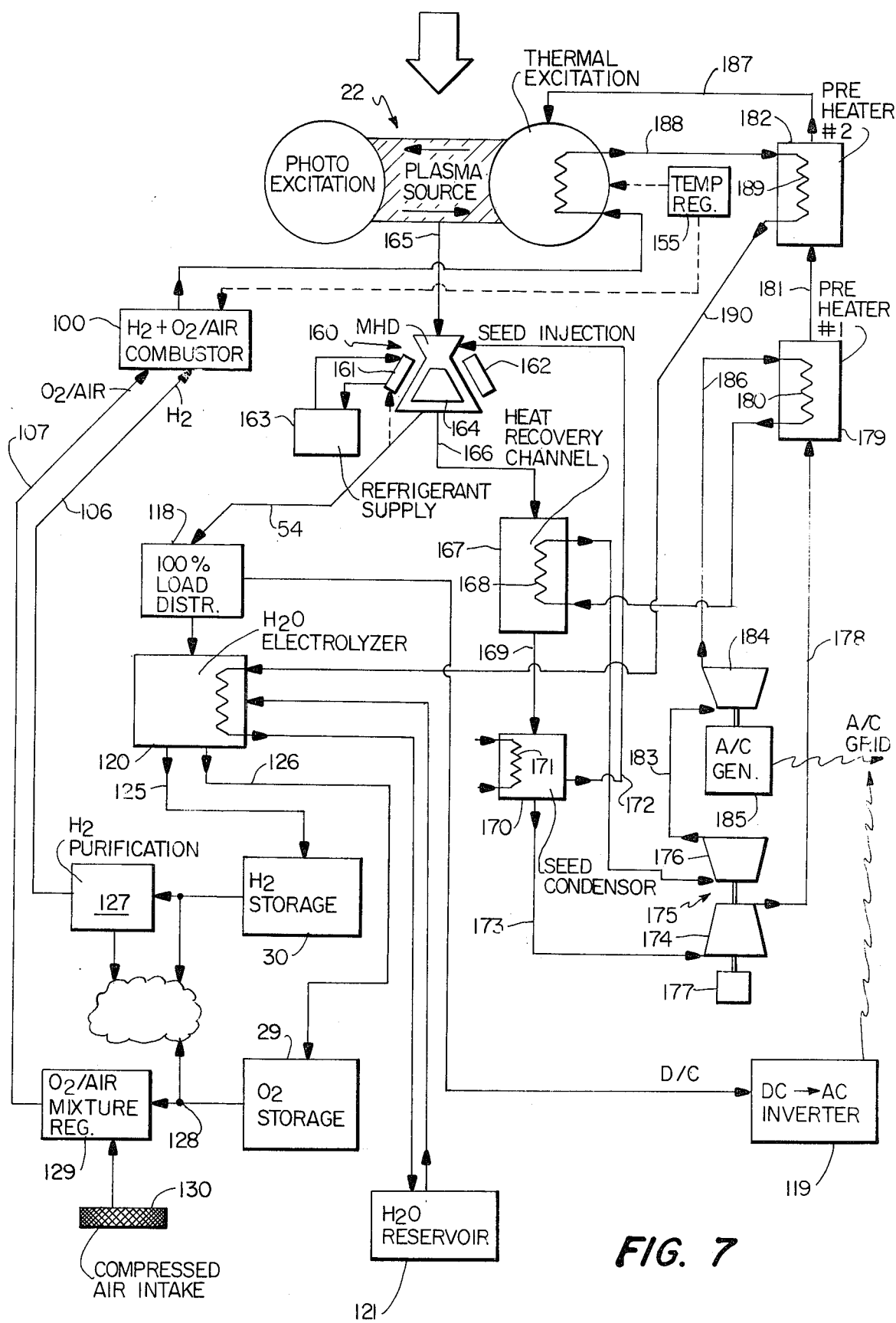
FIG. 7 is a block diagram, similar to FIG. 4, of a further embodiment of a system according to the invention.

Referring first to FIG. 7, this embodiment is shown in a block diagram form. Several portions thereof are substantially identical, on a block diagram level, to the system discussed with reference to FIG. 4, particularly in the area of hydrogen and oxygen storage, purification and distribution and the return thereof to the plasma excitation portion of the apparatus for thermal excitation of the working fluid. The blocks relating to this portion of the system have therefore been numbered as in FIG. 4, and will not be further discussed in connection with FIG. 7.

In FIG. 7, an MHD generator indicated generally at 160 is provided with magnets 161 and 162 which can be superconducting magnets in which case they are supplied with refrigerant through suitable conduits from a refrigerant supply 163. DC power is removed from collector arrays 164 on conductors 54, as previously described. Plasma working fluid is supplied to the input end of the generator as indicated at 165 to produce electrical power as previously described. The working fluid emerging from the MHD generator at 166 passes through a heat recovery channel 167 which includes a heat exchanger 168 through which a second working fluid passes, the temperature of the second working fluid being elevated as it passes upwardly through exchanger 168. The plasma working fluid, at a somewhat lower temperature, emerges from the lower end of the heat recovery channel at 169 and is conveyed in a conduit to a seed condenser 170 which also includes a heat exchanger 171 which is supplied with refrigerant to condense out the seed material, such as cesium, which is removed on a conduit 172 and delivered to a seed injection point at the input end of MHD generator 160. The working fluid with most of the seed removed, and at a slightly reduced temperature from point 169 emerges from the seed condenser at 173 and is conducted to the compressor portion 174 of an external high pressure vapor turbo-compressor indicated generally at 175. Turbo-compressor 175 includes the compressor portion 174, a turbine portion 176 and a starter motor 177, all of which are coupled to a common shaft, the turbine portion 176 thereof being connected to the output end of heat exchanger 168, the second working fluid at elevated temperature being used to drive the turbine and to compress the plasma working fluid arriving at the compressor on conduit 173. Compressed working fluid from compressor 174 is conducted upwardly on a conduit 178 to a first preheater 179 which includes a heat exchanger 180 wherein the working fluid is elevated in temperature and the conducted on conduit 181 to a second preheater 182 wherein the temperature of this working fluid is further elevated. To elevate this temperature, the second working fluid output from high pressure turbine 176 is conveyed on a conduit 183 to a low pressure vapor turbine 184 which can be connected to an output shaft driving an AC generator 185. This fluid is then conducted on a conduit 186 to the upper input end of heat exchanger 180, the output of this exchange being coupled back to the input end of the heat exchanger 168 in heat recovery channel 167.

The MHD working fluid emerging from preheater 182 is returned to the excitation unit 22 as indicated at 187 wherein it is thermally and photo excited to a plasma for return to the MHD generator at 165.

The second preheater is supplied with water vapor, or steam, resulting from the hydrogen and oxygen combustion in the thermal excitation portion of excitation unit 22 on conduit 188 to a heat exchanger 189 within preheater 182, the vapor emerging from the output of that heat exchanger being conveyed on a conduit 190 to electrolyzer 120, the heat therefrom being utilized to elevate the water temperature in the electrolyzer and to make the electrolysis process more efficient. The resulting water is returned to water reservoir 121.

As will be recognized, the major distinction between the diagrams of FIG. 4 and FIG. 7 are the provision of external compressor and turbine unit and the provision of multiple preheaters for the MHD working fluid. Employing the concepts shown in FIG. 7 results in a somewhat simpler power structure and a more efficient excitation unit as will be described with reference to FIGS. 8 and 9.

Referring first to FIG. 8, it will be seen that the overall configuration of the tower and solar radiation receiving structure is very similar, the apparatus also including a shroud 110, the function of which is the same as described with reference to FIG. 3. However, there are significant structural differences. The lower portion of the tower includes an outer wall 195 and a concentric inner wall 196, the inner wall 196 forming a conduit for the MHD working fluid emerging from the output end of MHD generator 160. As previously described, the MHD generator includes a generally conical conduit within which the working fluid expands, the lower end thereof being connected to a tapered diffuser section 197 at the upper end of inner portion 196. Magnets 161 and 162, as schematically illustrated in FIG. 8, are coupled to the refrigerant supply. At the upper end of the MHD generator is a reduced diameter nozzle 198 at which point the working fluid begins to expand, the nozzle being provided with seed injection means 199 which receives seed from seed condenser 170 on a conduit 172. A major portion of the inner wall section of this structure constitutes the heat recovery channel 167 and includes heat exchanger 168, the upper output end thereof being connected by a conduit 201 to the input of high pressure turbine 176 which is external to the tower and located nearby to minimize conduit length.

The lower portion of heat recovery channel 167 couples to a conduit which constitutes path 169 through which the MHD working fluid is conveyed to the seed recovery condenser 170 wherein the seed is condensed out of the working fluid, the remainder thereof being conveyed on conduit 173 to the input of compressor 174, the output thereof being conducted back into the channel defined by outer wall 195 through a conduit 178. As will be recognized, the annular passageway between walls 195 and 196 constitutes a first preheater 179 which contains a helical preheater coil which comprises heat exchanger 180. Thus, as the working fluid passes upwardly between walls 195 and 196, its temperature is elevated by heat from the second working fluid passing through coils 180 and also heat transferred through inner wall 196 from the working fluid passing downwardly therethrough. As previously indicated, the second working fluid is elevated in temperature as it passes through heat exchanger 168, this fluid then driving turbine 176 and turbine 184 after which it is coupled back into coil 180 by conduit 186.

The working fluid, after leaving the area of coil 180, passes upwardly around the MHD generator, the magnets thereof being insulated to minimize heat conduction between the working fluid and the magnets. The working fluid then continues to pass outwardly into the conical excitation unit which is connected to the upper end of cylindrical wall 195.

This excitation unit includes an outer frustoconical transparent wall 210 and an inner frustoconical transparent wall 211, the outer wall being coupled to the upper end of wall 195 at 212 and the inner wall being attached at 213 to a metallic or ceramic conical inlet portion 214 which leads into the MHD generator. These walls are spaced apart from each other and thus define a conical passageway around the collector through which the MHD fluid can pass upwardly. This flow of working fluid gas between the two transparent walls serves to keep the quartz transparent walls cooled below a strain point, the working fluid being at a moderate temperature level at this stage. At the upper end of walls 210 and 211 are generally annular and semi-toroidal shaped interconnecting wall portions 216 and 217 which are spaced apart and define a curving path to direct the flow of the working fluid from the space between walls 210 and 211 through a curved path and downwardly into an annular conical chamber defined by parallel frustoconical walls 218 and 219. The outer one of these walls 218 terminates in a circular lower edge 220 and the inner wall connects with the upper edge of an upwardly opening semi-torroidal wall portion 221 which redirects the flow of working fluid upwardly again, this time outwardly of wall 218.

Between walls 218 and 219 is a coil condiut, conically shaped to conform to the conical shape of these walls, this coil 222 constituting heat exchanger 189, the space between walls 218 and 219 being the second preheater 182 referred to in FIG. 7. At the upper end of the preheater portion 182 is an annular manifold conduit 223 which is connected to the upper turn of coil 222 which conveys the water vapor or steam emerging from the second preheater coil.

A thermal exciter structure indicated generally at 225 is generally conical in shape and lies approximately midway between walls 211 and 218, the upper end of the thermal exciter unit being spaced from the inner surface of wall 217, thus defining a chamber 226 through which working fluid emerging from the lower end of preheater space 182 can flow upwardly, around the upper end of thermal exciter unit 225 and then downwardly between the exciter unit and wall 211 through a chamber 227. At the lower end of chamber 227 the fluid passes through conical portion 214 leading into the MHD generator.

Exciter unit 225 also consists of two generally conical flow paths, the inner path 228 being connected to an annular conduit 229 which forms the bottom coil of coil assembly 222. An inner divider wall 230 separates flow path 228 from an upward flow path 231, the lower portion of which opens into a conical chamber 232 defined by wall 233. Chamber 232 is a combustor chamber into which hydrogen and oxygen are introduced by concentric conduits 234 and 235, conduit 235 being within conduit 234. Hydrogen is introduced through conduit 235 and oxygen through conduit 234, the conduits having openings 236 at the lower end thereof to permit the gases to merge and exothermically combine as discussed in connection with the apparatus of FIG. 3. This exothermic recombination produces high temperature steam which flows upwardly through flow path 231, around the upper end of intermediate wall 230 and downwardly through flow path 228. The water vapor then enters conduit 229 and flows upwardly through the conical helical set of coils 222 to manifold conduit 223 from which the water vapor flows into an exhaust conduit 190 (FIG. 7) which conveys the water vapor to the electrolyzer 120. As will be recognized, the inlets to conduits 234 and 235 constitute conduits 107 and 106, respectively, from the hydrogen and oxygen storage locations, and it will also be recognized that chamber 232 is equivalent to combustor chamber 100 of FIGS. 7 and 4.

FIG. 9 shows in greater detail a portion of the structure of thermal exciter unit 225 which can include a central dividing wall 230 of generally conical shape, an inner corrugated wall 240 and an outer corrugated wall 241, the corrugations being spot welded to wall 230 at their points of contact with that wall. A downwardly opening semi-torroidal wall 242 closes the upper end of the structure so that vapor can flow upwardly through chambers 231, reverse direction, and then flow downwardly through chambers 228. From this drawing, it will be seen that a plurality of substantially parallel flow paths are provided on each side of wall 230 and that a large amount of surface area is exposed for heat exchange between the hot water vapor, or superheated steam, resulting from the exothermic recombination of the hydrogen and oxygen and the MHD working fluid.

As will further be recognized, as was the case with the embodiment of FIG. 3, that the two working fluids are maintained completely separated from each other. A further feature of the structure shown in FIG. 9 is that the spot welds holding the corrugated walls to central wall 230 can be arranged so that they are closer together near the upper end of structure 225 than at the lower end, thereby promoting greater heat transfer near the upper end than at the lower end and serving to establish a counter flow heat exchange relationship along the length of the body.

Figure 10:
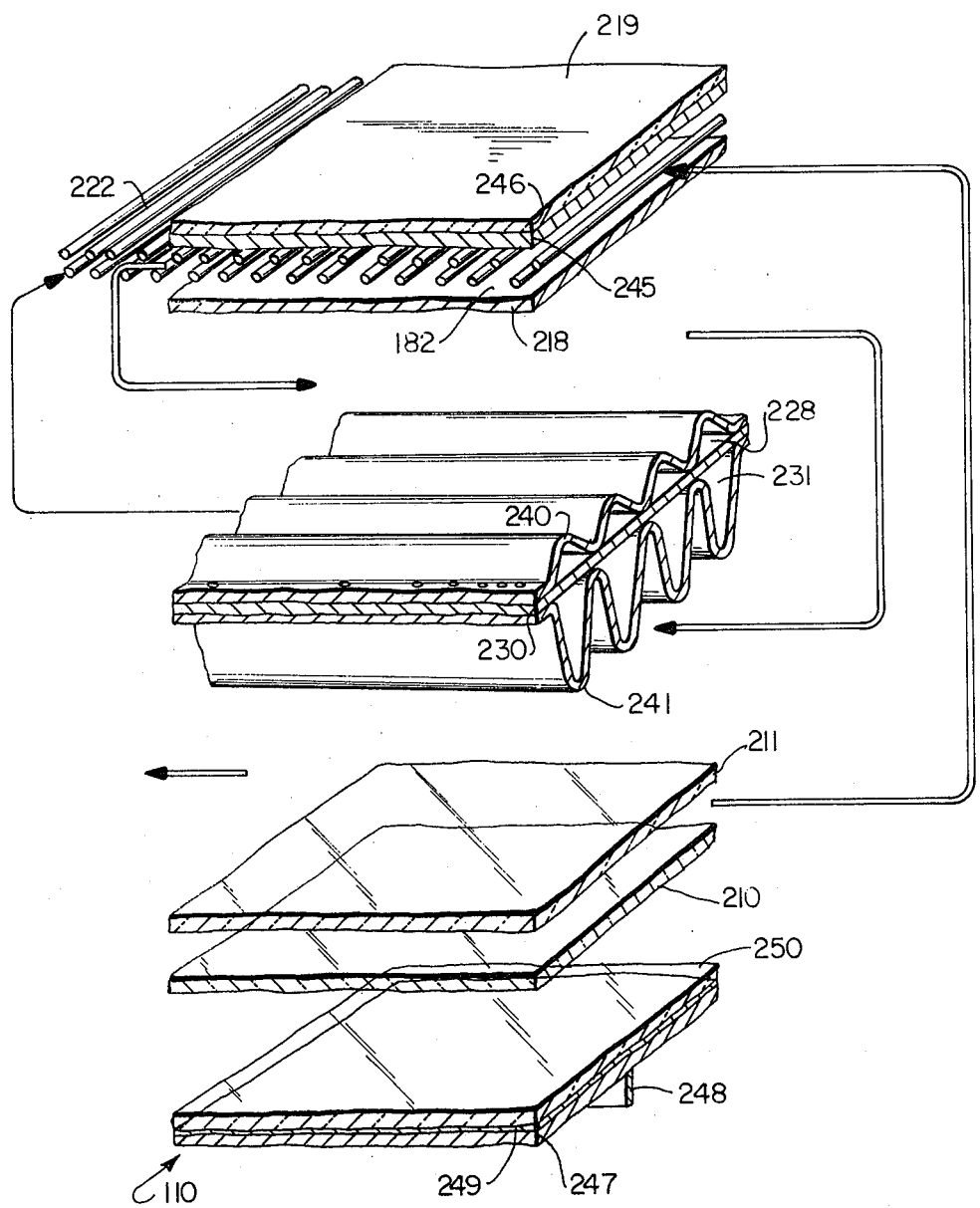
FIG. 10 is a partial perspective view, in section, of the excitation chamber portion of the apparatus of FIGS. 8 and 9.

A fragmentary section through the structure of the exciter unit cone is shown in FIG. 10. As seen therein, inner wall 219 can include a metallic wall 245 coated on its inner surface with a thermal insulating material 246 such as fiber glass or asbestos. Wall 218 can also be a metallic wall, such as mild steel. The space 182 therebetween contains tubes which form coil 222.

Thermal exciter 225 includes corrugated walls 240 and 241, as previously described, spot welded to central wall 230, these walls being formed using molybdenum, tungsten or any of the other metals previously described for high temperature use in this environment.

The transparent windows 210 and 211 can be quartz of approximately ten millimeter thickness. The outer shroud 110 can include a mild steel outer cone 247 provided with strengthening ribs 248 on the outer surface thereof, a layer of electrodeposited silver 249 on the inner surface of cone 247, or silver nitrate 249 on the outer surface of cone 250 and a conical glass layer or body 250 as the innermost portion of the shroud.

While certain advantageous embodiments have been chosen to illustrate the invention, it will be understood by those skilled in the art that various changes and modifications can be made therein without departing from the scope of the invention as defined in the appended claims.

What I claim is:

1. An energy conversion system comprising
an ionizable working fluid;
a magnetohydrodynamic generator including
conduit means for providing a path through said generator for said fluid, said conduit means having input and output ends,
means for establishing a magnetic field in said conduit means, and
means for collecting charged particles from within said conduit means and for delivering electrical energy to a load device;
means for providing a closed flow path for said working fluid from the output of said generator conduit means and to the input thereof, including
means adjacent the input end of said generator conduit means for exciting said working fluid to an elevated energy level at which said fluid is at least partially ionized into a plasma,
means for inducing flow of said plasma into said MHD conduit means,
heat exchanger means coupled to the output of said MHD generator conduit means for reducing the temperature of said working fluid by extractinng heat therefrom, and
means for delivering said working fluid from said heat exchanger to said means for exciting; and
a plurality of heliostats arranged to receive solar radiation and to direct said radiation onto said means for exciting;
said means for exciting including first wall means transparent to solar radiation for permitting solar radiation to pass therethrough, and second wall means opaque to solar radiation for absorbing energy from solar radiation incident thereon;

said first and second wall means being interconnected to form a conduit chamber through which said working fluid can pass, said first and second wall means being substantially perpendicular to the direction of radiation reflected from said heliostats with said first wall means between said second wall means and said heliostats;

whereby said working fluid is excited toward non-equilibrium thermal ionization by energy absorbed from said radiation by said second wall means and is at least partially photo-ionized by radiation passing through said first wall means and by radiation re-emitted by said second wall means.

2. A system according to claim 1 wherein said ionizable working fluid includes a mixture of a gas selected from the group consisting of helium, neon, argon, krypton, xenon, radon and water with a significantly smaller quantity, by weight, of a material selected from the group consisting of lithium, sodium, potassium, rubidium, cesium, franconium and salts thereof.

3. A system according to claim 1 wherein said ionizable working fluid is a mixture of argon and cesium and wherein said cesium comprises between about 0.01% and about 2.0% of said mixture, by weight.

4. a system according to claim 1 wherein said means for inducing flow of said plasma includes
a rotatable compressor mounted adjacent the input of said generator;
a vapor turbine;
a shaft interconnecting said turbine with said compressor;
turbine conduit means in heat absorbing relationship with said heat exchanger means and connected to said turbine; and
an expandable fluid in said turbine conduit means, said fluid being heated by said heat exchanger means and expanded to drive said turbine, shaft and compressor to drive said plasma into said generator.

5. A system according to claim 1 wherein said load device includes a source of water;
means for accepting the electrical energy from said generator and water from said source and for electrolytically separating said water into gaseous hydrogen and oxygen;
means for using waste heat of the system for elevating the temperature of the water in said electrolyzer; and
means for separately storing said hydrogen and oxygen.

6. A system according to claim 5 wherein said means for exciting said working fluid further includes
a combustion chamber in intimate heat exchange relationship with said working fluid;
means for separately conveying gaseous hydrogen and oxygen from said means for storing to said combustion chamber wherein said oxygen and hydrogen are exothermically combined, the heat therefrom being conducted to said working fluid for thermal excitation thereof.

7. A system according to claim 6 and further comprising a shroud movable between a first position in which said shroud is interposed in the path of radiation between said heliostats and said first wall means, and a second position in which said shroud is removed from said path,
said shroud having low thermal conductivity and high radiation reflectively to contain heat and radiation in said working fluid during intervals of low solar radiation.

8. An energy conversion system comprising
an ionizable working fluid;
a magnetohydrodynamic generator having an input and an output for said working fluid;
means for providing an endless closed path for said working fluid between the output and input of said generator and for producing flow of said fluid in said path;
means in said path for exciting said working fluid to an elevated energy level at which said fluid is at least partially ionized into a plasma;
means for concentrating solar radiation on said means for exciting so that said fluid is excited by both thermal and photon energy absorption; and
circuit means connected to said generator for removing electrical energy therefrom,
wherein said means for exciting includes
means defining an annular chamber having an outer wall portion exposed to said radiation, an inner wall portion having a radiation reflective surface, and an intermediate wall portion separating said chamber into a first flow path between said inner and intermediate wall portions and a second flow path between said outer and intermediate wall portions for said working fluid,
said inner and outer walls being connected to each other to provide an interconnecting flow path around an end of said intermediate wall portion,
said outer wall portion being substantially transparent to solar radiation,
said inner wall portion being radiation reflective, and
said intermediate wall portion being radiation absorptive such that working fluid is thermally excited as it passes the intermediate wall portion.

9. A system according to claim 8 wherein
each of said inner and outer wall portions includes parallel spaced apart wall members sealed to each other to define evacuated spaces therebetween for insulation against conductive heat loss.

10. A system according to claim 8 wherein each of said inner, outer and intermediate wall portions are generally frustoconical in shape and are concentrically arranged around a common vertical axis with the larger diameter of each wall portion at the top.

11. A system according to claim 10 and further comprising
an annular combustion chamber disposed radially inwardly of said inner wall portion;
a source of hydrogen and a source of oxygen;
conduit means for delivering gaseous hydrogen and oxygen from said sources to said combustion chamber for exothermic reaction therein;
an annular jacket at least partially enclosing said combustion chamber, said jacket being connected to said first flow path; and
means for delivering working fluid to said jacket for flow therethrough to said first flow path, the temperature of said working fluid being elevated by said reaction in said combustion chamber.

12. A system according to claim 11 and further comprising
a source of water;
electrolyzer means connected to said source of water and said circuit means for electrolytically dissociating water from said source into hydrogen and oxygen;
means coupled to said electrolyzer means for separately storing said hydrogen and oxygen,
said means for storing being usable as said sources of hydrogen and oxygen for said combustion chamber.

13. A base load energy conversion systemm comprising
a closed cycle magnetohydrodynamic generator for generating electrical power having a working fluid and conduit means for recirculating said working fluid through said generator;
means in said conduit means for ionizing said working fluids;
a source of water;
means for receiving electrical power produced by said magnetohydrodynamic generator and for electrolyzing water from said source into hydrogen and oxygen;
means for separately storing said hydrogen and oxygen; and means for concentrating solar radiation on said means for ionizing,
said means for ionizing including
means responsive to the concentrated solar energy for promoting ionization of said working fluid, and
means for receiving hydrogen and oxygen from said means for storing and for exothermically combining said hydrogen and oxygen in intimate heat exchange relationship with said working fluid for promoting ionization thereof.

14. A method of energy conversion comprising the steps of
providing an ionizable working fluid,
passing said fluid through a chamber having a portion thereof exposed to solar radiation,
ionizing said working fluid to form a plasma,
delivering said plasma to a magnetohydrodynamic generator in the presence of a magnetic field to produce electrical energy,
continuously recirculating the working fluid from the outlet of said magnetchydrodynamic generator to said chamber for re-ionization,
and wherein the step of ionizing includes, during intervals of maximum solar radiation, the steps of
passing said working fluid through a closed chamber having a portion transparent to solar radiation so that said fluid is ionized by thermal and photon energy, and
simultaneously concentrating solar energy on the transparent portion of the chamber,
and wherein the step of ionizing includes, during intervals of reduced solar radiation, the steps of
producing an exothermic reaction in a combustion chamber, and
passing the working fluid adjacent the combustion chamber and in intimate heat exchange relationship therewith so that the fluid is thermally ionized.

15. A method according to claim 14 which further includes the steps of
delivering water to an electrolyzer,
simultaneously delivering at least a portion of the electrical energy from the magnetohydrodynamic generator to the electrolyzer to electrolytically dissociate the water into hydrogen and oxygen, and
separately storing the hydrogen and oxygen.

16. A method according to claim 15 wherein the steps of delivering water to the electrolyzer, delivering electrical energy thereto for dissociating the water and separately storing the hydrogen and oxygen are preformed only during intervals of maximum solar radiation, and
during the intervals of reduced solar radiation, the exothermic reaction is produced by the step of
delivering the stored hydrogen and oxygen to the combustion chamber for exothermic recombination into water vapor.

* * * * *